Figure 1:
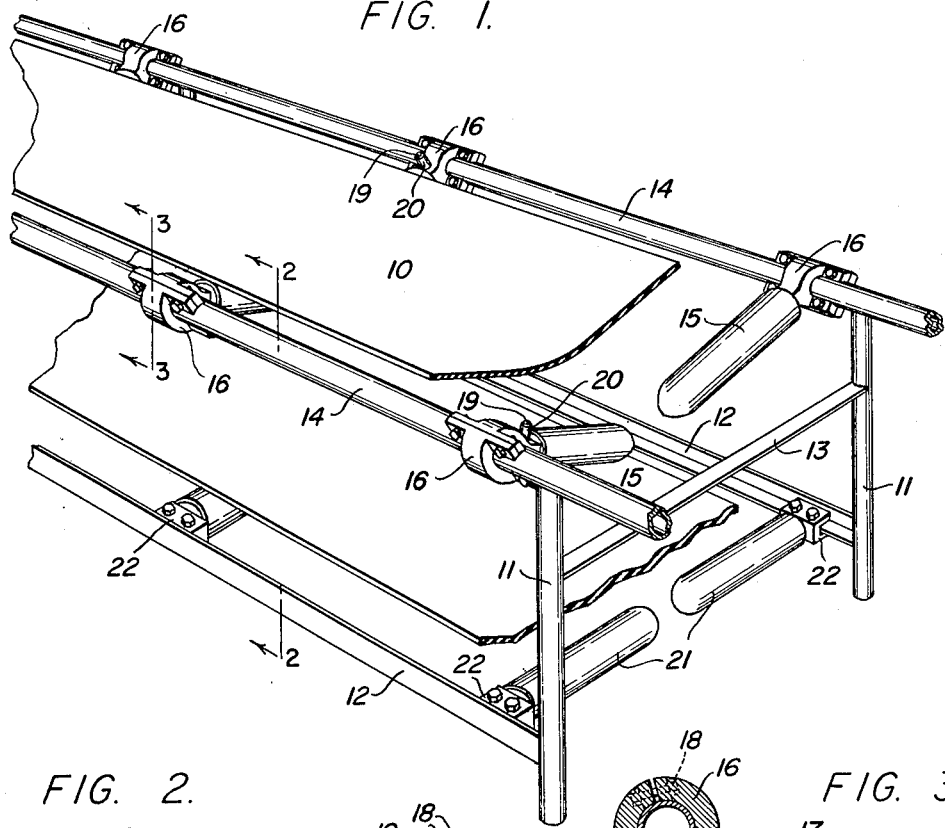

June 23, 1964 S. D. MICHAELSON 3,138,240
IDLER STRUCTURE FOR BELT CONVEYORS
Filed Jan. 24, 1961

INVENTOR.
STANLEY D. MICHAELSON
BY *Mallinckrodt*
   *Mallinckrodt*
ATTORNEYS

United States Patent Office 3,138,240
Patented June 23, 1964

3,138,240
IDLER STRUCTURE FOR BELT CONVEYORS
Stanley D. Michaelson, Salt Lake City, Utah, assignor to Kennecott Copper Corporation, New York, N.Y., a corporation of New York
Filed Jan. 24, 1961, Ser. No. 84,655
1 Claim. (Cl. 198—192)

This invention relates to idler structures for supporting endless conveyor belts in their travel, and particularly to structures of this type arranged to trough the working run of the belt and to absorb impact at loading points.

Troughed belt conveyors are widely used in mining, quarrying, and construction work to transport heavy bulk material from one location to another. Troughing is a function of belt-troughing idlers, which are customarily pre-formed to give the desired troughing angle for any given job. Change in troughing angle requirements means replacement of belt-troughing idlers. Often the material to be transported consists of or includes heavy chunks of ore or rock which can cause serious damage when dropped on the belt during loading.

Various constructions and arrangements for the belt-troughing idlers and idler-mounting brackets have been proposed heretofore for achieving advantages of various kinds, as, for example, eliminating or minimizing structural damage due to impact at loading points so as to insure longer working life and fewer repairs. However, so far as known, nothing of significance has been done about making the troughing angle easily adjustable.

The present invention is concerned with providing a new belt conveyor idler structure having a number of advantages over those known heretofore, including adjustability of belt-troughing angle.

Principal objects of the invention are to provide for quick and easy adjustability of troughing angle, significant savings in construction costs, superior impact absorption at loading points, replaceability of idlers during belt operation, and greater belt-carrying capacity for a given size belt.

Outstanding features in the accomplishment of these objects are the provision of sets of cantilever idlers extending transversely of the belt at intervals along its length from adjustable securement to supporting structure disposed laterally of the belt. Each set of idlers includes a pair of mutually opposite idlers cantilevered from the supporting structure at respective sides of the belt and preferably terminating short of the longitudinal axis of the belt to leave a portion of the width of the belt at its middle free and clear of support.

In line with the basic teachings of copending application Serial No. 850,466 filed November 2, 1959, now Patent No. 2,989,170, issued June 20, 1961, by Robert E. Meyer and myself, it is preferred that, at loading points, the supporting structure comprise rigid torsion bars extending longitudinally of the belt at opposite lateral sides thereof as torque-absorbent means. By rigidly clamping the idlers to such torsion bars in cantilever fashion, angular adjustments thereof relative to the horizontal are easily and quickly made. Moreover, replacements of individual idlers can be also made easily and quickly.

At other than loading points, ordinary iron or steel pipe or structural shapes, such as channels or angles, will suffice as supporting structure for cantilevered idlers.

The idlers advantageously comprise elongate rollers, rounded or otherwise contoured at their ends to prevent cutting into the belt's undersurface. They extend rigidly and in cantilever fashion under and across the lateral margins of the belt, for rotation as the belt travels. As so placed and supported, they serve very effectively to transmit downward impact, exerted against the load-carrying surface of the belt, to the supporting structure as torque for absorption by whatever means are provided for that purpose, e.g. by the torsion bars mentioned above.

It is preferred that the elongate rollers be directly mounted on respective dead shafts by anti-friction bearings, and that the dead shafts be secured to respective clamps, which serve as easily adjustable, mounting brackets.

A specific embodiment of the above concepts, presently regarded as the best mode of carrying out the invention, is illustrated in the accompanying drawing along with certain other feasible embodiments.

Figure 2:
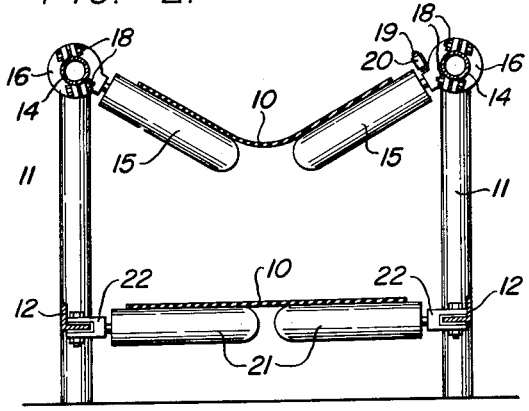
Figure 3:
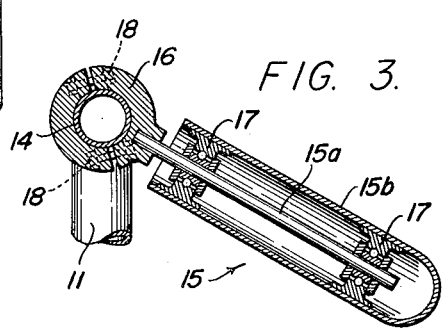
Figure 4:
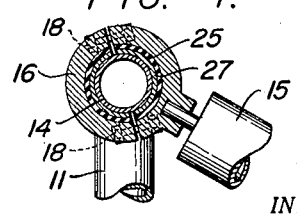
Figures 5, 6:
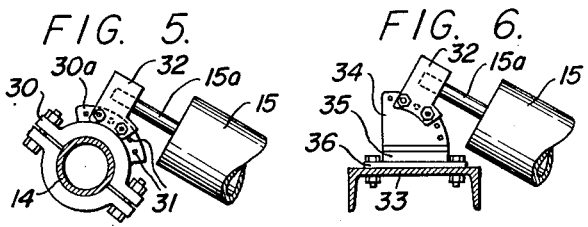

In the drawing:

FIG. 1 represents a fragmentary perspective view of one type of troughed belt conveyor constructed in accordance with the invention;

FIG. 2, a vertical section taken on the line 2—2 of FIG. 1;

FIG. 3, a fragmentary vertical section taken on the line 3—3 of FIG. 1 and drawn to an enlarged scale;

FIG. 4, a view corresponding to that of FIG. 3, but illustrating a torque-absorbent connection of idler to supporting structure;

FIG. 5, a fragmentary view largely corresponding to the left-hand portion of FIG. 3, but showing a different way of providing adjustability of belt-troughing angle; and FIG. 6, a view corresponding to that of FIG. 5, but indicating how adjustability can be had when the supporting structure is not cylindrical.

Referring to the drawing:

The belt conveyor shown fragmentarily in FIGS. 1-4 represents merely one type of construction to which the invention is applicable. It comprises idler-supporting structure in the form of a rigid framework, extending longitudinally and transversely of the path of travel of the belt 10, for mounting the idlers which directly receive and guide such belt.

The framework includes standards 11 placed at opposite lateral sides of the belt and at intervals along the length of the belt, these being interconnected longitudinally of the conveyor and near the return run of the belt by structural members 12 and transversely of the conveyor by structural members 13.

Extending longitudinally of the standards 11 at respectively opposite lateral sides of the belt and rigidly secured, as by welding, to the upper ends of such standards near the upper, working run of the belt are elongate cylindrical members 14 forming an integral part of the framework and serving to mount cantilever idlers 15 which directly receive and support such working run of the belt. As illustrated, the standards 11 are widely spaced along the lengths of the cylindrical members or torsion bars 14, and the several idlers 15 are positioned at widely spaced locations relative to one another along the lengths of such members or torsion bars 14.

The conveyor portion shown in FIG. 1 is taken from intermediate the length of the conveyor, away from loading stations, where impact is not a factor. Accordingly, no provision is shown for impact absorption. The cylindrical members 14 are ordinary iron or steel pipes, and the cantilever idlers 15 are rigidly secured to such pipes by means of clamps 16 serving as mounting brackets.

Each idler 15 comprises a so-called "dead" shaft 15a, FIG. 3, firmly rooted in a clamp 16 and projecting transversely of the adjacent margin of belt 10 but terminating short of the longitudinal axis of the belt. Rotatably mounted on such dead shaft 15a, preferably by means of anti-friction bearings 17, is an elongate idler roller 15b having a rounded end 15c so as not to cut into the belt. As so mounted, the rollers 15b extend under and transversely of respective adjacent margins of the belt and, like the dead shafts 15a that carry them, terminate short of the longitudinal axis of the belt.

The clamps used as idler-mounting brackets can be of any suitable type affording firm securement of the idlers 15 to the cylindrical members 14 of the framework. As illustrated, each clamp comprises two separate but similar jaws adapted to, together, encircle a pipe 14 and to be clamped tightly in place therearound by means of bolts 18. Belt-troughing angle can be established and thereafter quickly and easily adjusted as desired by merely loosening the bolts, turning the clamps upwardly or downwardly to an appropriate extent, and retightening the bolts. Similarly, by removing the bolts 18 from any one or more of the brackets, the corresponding cantilever idler or idlers may be quickly and easily removed and replaced.

Certain of the clamps 16 are advantageously provided with upstanding stub shafts 19, FIG. 1, on which are rotatably mounted guide rollers 20 for keeping the belt in line.

The return run of the belt can be handled in any suitable manner. However, it is preferred for the sake of economy to utilize cantilever idlers 21, FIGS. 1 and 2, that correspond in construction and are interchangeable with the idlers 15. These idlers 21 are mounted on structural members 12 by means of brackets 22.

At loading stations, where it is highly desirable that the supporting structure for the conveyor belt be equipped for absorption of impact, it is preferable that the conveyor be constructed just as shown in FIGS. 1–4 except for the use of torsion bars in place of the ordinary iron or steel pipes 14. However, absorption of impact may be provided for by use of the impact-absorbent clamp of FIG. 4, where rubber 25 or other suitable flexible and resilient material is interposed between clamp and pipe. In this construction, it is preferable that the rubber 25 be interposed between and vulcanized to the individual jaw members of clamp 16 and respective shoes 27.

In either of the above instances, impact exerted against the upper face of the working run of the conveyor belt will be transmitted as torque by the cantilever idlers to their mounting brackets and from them into the impact absorption means.

Adjustability of troughing angle may be provided for without the need of re-adjusting the positions of the clamps on their supporting pipes or torsion bars, although the scope of adjustment will not be as great. As shown in FIG. 5, the inner jaw member 30 of each clamp can be formed with an outwardly protruding, arcuate rib 30a, having a series of bolt holes 31 extending along its length. The dead shaft 15a of idler 15 is rooted in a bracket member 32, which is fastened to the clamp by bolting through selected holes 31 of rib 30a corresponding to the desired troughing angle. Change of troughing angle is accomplished merely by unbolting and rebolting in a different position.

A similar arrangement enables adjustment of troughing angle regardless of the type of idler-supporting structure employed. Thus, as shown by FIG. 6, where structural channels 33 instead of pipe or torsion bars are utilized for idler support, a rib plate 34 is secured in some suitable manner to channel 33. While plate 34 may be welded or otherwise secured directly to channel 33, a rubber pad 35 is interposed as torque absorption means in the illustrated instance. As illustrated, such pad 35 is secured between rib plate 34 and a base plate 36 by means of vulcanization and such base plate is bolted to the web of channel 33.

In FIGS. 1 and 2, the cantilever idlers are shown in pairs, with the idlers of each pair located directly opposite each other across the width of the belt and terminating short of the longitudinal axis of the belt. However, it is not necessary that they be so arranged. For example, a staggered arrangement is desirable in instances where standard length idlers are used for a variety of belt widths, so that the idlers can extend beyond the longitudinal axis of the belt when the belt is so narrow as to require it.

While the invention is disclosed in detail with respect to a belt conveyor having a troughed working run, it should be realized that the working run of the conveyor may be flat in appropriate instances, as is indicated by the return run of the belt in FIGS. 1 and 2.

The term "rigid" as employed herein in connection with the torsion bars and idlers is used to describe the normal condition of such bars and idlers. It is quite apparent that appropriate yielding under impact is intended.

Whereas there are here illustrated and described certain preferred forms of apparatus which I presently regard as the best mode of carrying out my invention, it should be understood that various changes may be made without departing from the inventive concepts particularly pointed out and distinctly claimed herebelow.

I claim:

In a belt conveyor, the combination of an endless conveyor belt; spaced, parallel, rigid torsion bars; means rigidly mounting said torsion bars at widely spaced locations; idler-mounting brackets at mutually opposite lateral sides of the belt for absorbing impact, each of said impact-absorbing brackets being rigidly connected to only one of said torsion bars and the several brackets being positioned at widely spaced locations relative to one another along the lengths of said torsion bars and at locations widely spaced from the said means rigidly mounting said torsion bars; cantilever idlers supporting the upper, working run of the belt, each of said idlers being secured at one of its ends to one of said brackets and extending transversely of the adjacent margin of the belt to an unsupported termination intermediate the width of the belt; and means associated with said brackets for adjusting the troughing angle of the cantilever idlers.

References Cited in the file of this patent

UNITED STATES PATENTS

| 2,773,257 | Craggs et al. | Dec. 4, 1956 |
| 2,974,777 | Marsh | Mar. 14, 1961 |
| 2,976,982 | Murphy | Mar. 28, 1961 |

FOREIGN PATENTS

| 45,285 | Germany | May 17, 1888 |
| 352,854 | Great Britain | July 16, 1931 |
| 553,076 | Great Britain | May 6, 1943 |
| 688,540 | Great Britain | Mar. 11, 1953 |
| 1,229,493 | France | Mar. 21, 1960 |